United States Patent [19]

Bedard et al.

[11] Patent Number: 5,179,051
[45] Date of Patent: * Jan. 12, 1993

[54] HIGH DENSITY LITHIUM-BASED CERAMICS FROM ZEOLITES

[75] Inventors: Robert L. Bedard, Fishkill; Edith M. Flanigen, Westchester, both of N.Y.

[73] Assignee: UOP, Des Plaines, Ill.

[*] Notice: The portion of the term of this patent subsequent to Dec. 25, 2007 has been disclaimed.

[21] Appl. No.: 808,399

[22] Filed: Dec. 16, 1991

[51] Int. Cl.⁵ .................. C04B 35/16; C04B 35/02; C04B 35/18; B32B 5/16
[52] U.S. Cl. .................................. 501/128; 501/1; 501/6; 501/94; 428/328; 428/330
[58] Field of Search ............... 501/118, 119, 122, 128, 501/154, 1, 6, 94; 428/328, 330

[56] References Cited

U.S. PATENT DOCUMENTS

| | | | |
|---|---|---|---|
| 3,008,803 | 11/1961 | Milton | 23/113 |
| 4,814,303 | 3/1989 | Chowdhry et al. | 501/119 |
| 4,980,323 | 12/1990 | Bedard et al. | 501/119 |

FOREIGN PATENT DOCUMENTS

| | | |
|---|---|---|
| 315282 | 10/1989 | European Pat. Off. . |
| 298701 | 11/1989 | European Pat. Off. . |

OTHER PUBLICATIONS

D. W. Breck in Zeolite Molecular Sieves, John Wiley & Sons, New York (1974) pp. 493-396.
V. Dondur and R. Dimitrijevic, *J. Solid Chem.*, 63, (1986) 46-51.
M. A. Subramonian et al., *Mat. Res. Bull.*, 21, (1986) 1525-1532.

*Primary Examiner*—Karl Group
*Assistant Examiner*—Michael A. Marcheschi
*Attorney, Agent, or Firm*—Thomas K. McBride; Eugene I. Snyder; Frank S. Molinaro

[57] ABSTRACT

This invention relates to a process for preparing a lithium containing ceramic article. The process provides a ceramic article that is substantially crack free and has as its principal crystalline phase a beta-eucryptite phase, a beta-spodumene phase, or a mixture thereof. The process comprises calcining a powder of a lithium-exchanged zeolite up to its collapse temperature for a time sufficient to collapse the zeolite framework and provide an amorphous powder. The amorphous powder is now formed into a shaped article and sintered at a temperature of about 700° to about 1150° C. for a time of about 1 to about 12 hours. The zeolites which can be used are those having a $SiO_2Al_2O_3$ ratio of about 2 to about 8.5 and include zeolite B, zeolite ZK-19, zeolite W, phillipsite, hormotome, gismondine and mixtures thereof and have a sodium content less than about 1 weight percent. It is preferred that the lithium-exchanged zeolite have an average particle size of less than about 10 microns.

4 Claims, No Drawings

HIGH DENSITY LITHIUM-BASED CERAMICS FROM ZEOLITES

Ceramic articles have many uses including catalyst supports, dental porcelain, heat exchangers, turbine blades, substrates for integrated circuits, etc. The particular ceramic which is used in a given application depends on the properties required for the given application. For example, lithium-based ceramics such as beta-eucryptite and beta-spodumene have low thermal shock and find applications as honeycomb substrates for supporting catalysts, electronic substrates and mirror blanks. Beta-eucryptite and beta-spodumene are lithium aluminosilicate compositions.

The conventional manner of preparing lithium aluminosilicate ceramics is to sinter the respective oxides at high temperatures. Although this process can yield satisfactory ceramics, there is a need to form these ceramics at lower temperatures. Applicants have developed a process which yields a high density ceramic article that is substantially crack free and has a crystalline phase of either beta-eucryptite or beta-spodumene at a substantially lower temperature than previous processes. The process involves calcining a lithium-exchanged zeolite up to its collapse temperature to give an amorphous powder, forming the amorphous powder into a desired shape and sintering at a temperature of about 700° to about 1150° C. This process produces ceramic articles which are substantially crack free.

The prior art describes the preparation of ceramics from zeolites. For example, D. W. Breck in ZEOLITE MOLECULAR SIEVES, John Wiley & Sons, New York (1974), pp. 493-496 states that Mg-X can be heated to form cordierite. The disclosed process involves heating the Mg-X zeolite at 1500° C. to form a glass and then heating the glass above 1000° C. to form cordierite.

Another reference which teaches the preparation of a cordierite based ceramic article is U.S. Pat. No. 4,814,303 to Chowdry et al. Chowdry discloses producing a monolithic anorthite, anorthite-cordierite or cordierite based ceramic article by heating the Ca, Ca/Mg and Mg forms of zeolites X, Y and A at a temperature of about 900° C. to about 1350° C. Chowdry also discloses that one should maximize the removal of sodium present in the zeolites since sodium ions are known to significantly increase the dielectric constant and dielectric loss.

European Patent Publication Number 298,701 describes the preparation of a ceramic article having an anorthite phase from a calcium zeolite. The process involves a calcination to form an amorphous product which can then be shaped into an article and sintered at temperatures of about 850°-950° C.

Finally, the preparation of beta-spodumene from lithium zeolite-Y and beta-eucryptite from lithium zeolite-A is reported in *Mat. Res. Bull.*, 21, (1986) 1525-1532 and *J. Solid State Chem.*, 63, (1986) 46-51 respectively. However, neither of these references disclose the preparation of a crack free dense beta-spodumene or beta-eucryptite ceramic article.

None of these reference disclose or render obvious applicants' two step process for producing a lithium-based ceramic article. Applicants have observed that the collapse temperature of each zeolite must be individually determined so that recrystallization does not occur. The importance of the collapse temperature is nowhere mentioned nor recognized in the prior art.

SUMMARY OF THE INVENTION

This invention relates to a process for making a dense lithium aluminosilicate crystalline ceramic article. Specifically the process comprises calcining a powder of a lithium-exchanged zeolite having a $SiO_2/Al_2O_3$ ratio from about 2 to about 8.5 selected from the group consisting of zeolite B, zeolite ZK-19, zeolite W, phillipsite, hormotome, gismondine and mixtures thereof and having a sodium content less than about 1 weight percent, at the collapse temperature of the zeolite for a time sufficient to collapse the zeolite framework and provide an amorphous powder, forming the amorphous powder into a shaped article and sintering the shaped article at a temperature of about 700° C. to about 1150° C., for a time of about 1 to about 12 hours, thereby forming a substantially crystalline ceramic article whose principal crystalline phase is a beta-eucryptite phase, beta-spodumene phase, or a mixture thereof, has a density of at least 90% of its theoretical density and is substantially crack free.

DETAILED DESCRIPTION OF THE INVENTION

As stated, this invention relates to a process for preparing a dense lithium aluminosilicate crystalline ceramic article. The ceramic article is prepared from a lithium-exchanged zeolite. Zeolites are well known microporous three-dimensional framework structures. In general the crystalline zeolites are formed from corner sharing $AlO_2$ and $SiO_2$ tetrahedra and are characterized as having pore openings of uniform dimensions, having a significant ion-exchange capacity and being capable of reversibly desorbing an adsorbed phase which is dispersed throughout the internal pores or voids of the crystal without displacing any atoms which make up the permanent crystal structure.

Zeolites can be represented on an anhydrous basis, by the formula

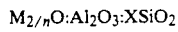

$$M_{2/n}O:Al_2O_3:XSiO_2$$

where M is a cation having the valence n, X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques.

The zeolites which can be used in this invention are those zeolites which have a $SiO_2/Al_2O_3$ ratio from about 2 to about 8.5. Specific examples of these zeolites are zeolite B, zeolite ZK-19, zeolite W, phillipsite, hormotome, gismondine and mixtures thereof. These zeolites contain Na, K, Ca or Ba as the cation. For example, zeolite B is usually synthesized in the sodium form, hormotome occurs in the barium form and phillipsite occurs as a mixture of potassium, sodium and calcium form. The preparation of these zeolites is well known in the art and specifically the synthesis of zeolite B is found in U.S. Pat. No. 3,008,803 which is incorporated by reference. In the description which follows, zeolite B will be used to exemplify the process of the invention. However, this is not to be construed as limiting the invention in any way to zeolite B.

Zeolite B is a synthetic zeolite having the formula $Na_2O:Al_2O_3:xSiO_2$ where x varies from about 2 to about 5. The synthesis of zeolite B as described in U.S. Pat. No. 3,008,803 essentially entails forming a mixture of sodium aluminate (NaAlO₂), sodium silicate, sodium hydroxide and colloidal silica, and heating this mixture at a temperature of about 60°-150° C., under autogenous pressure for a time of about 12 to about 96 hours. The resultant product is isolated, washed and dried.

Lithium is now exchanged for the sodium cation. It is necessary to maximize the substitution of lithium for sodium. Two techniques are generally used to remove the sodium cation. One technique is a multiple ion exchange with the lithium cation while the other technique involves pre-exchanging the zeolite with a cation such as $NH_4+$ followed by ion exchange with the lithium ion.

Ion exchange is conveniently carried out by contacting the zeolite with an aqueous solution of the metal ion to be exchanged. Thus a dilute (about 1 molar) aqueous solution of lithium chloride is prepared and the pH of the solution is adjusted to about 9 with lithium hydroxide. The volume of solution which is prepared is that amount which provides from about 5 to about 10 times the amount of lithium ion needed to fully ion exchange the sodium or other alkali metals in the zeolite.

The contacting of the lithium chloride solution with the zeolite can conveniently be carried out in a batch process. Accordingly, the solution is mixed with the zeolite powder and the mixture is refluxed for about 2 hours. Next the mixture is filtered thereby isolating the zeolite powder. This procedure is repeated with a fresh batch of solution until the sodium level is less than 1 weight percent and preferably less than 0.5 weight percent. Thus, as used in this application a lithium exchanged zeolite is one that contains less than 1 weight percent sodium or other cations initially present in the desired zeolite. These sodium levels can usually be achieved within five repetitions of the ion exchange procedure. Alternatively, the lithium exchange can be carried out using a continuous process employing methods well known in the art such as placing the zeolite in a column and flowing the lithium solution through the column or using a basket centrifuge. A continuous process has the advantage of allowing a more efficient utilization of the lithium solution.

Having obtained the lithium-exchanged zeolite, the next step in the process is to calcine the powder in order to collapse the zeolite structure and give an amorphous powder. The temperature at which the calcination is carried out is determined by taking a small compressed (compressed at 5000 psi) sample of the material and using dilatometry to determine the collapse temperature. The collapse temperature is the first inflection point of the dilatometry curve. The second inflection point corresponds to the sintering of the powder to a dense product. A zeolite powder with only one inflection point (e.g., lithium zeolite-X or lithium zeolite-Y) is not suitable for this process. Each lithium-exchanged zeolite will have a slightly different collapse temperature which must be determined in this manner.

It is necessary to predetermine the zeolite collapse temperature in order to obtain a dense, crack-free ceramic article. The zeolite is heated at a temperature above the collapse temperature but below the sintering temperature as indicated by the dilatometry trace.

If the zeolite is heated above the sintering temperature, the lithium containing zeolite may recrystallize and render the powder unsinterable. That is, the powder cannot be sintered to form a dense crack-free ceramic article.

Having determined the collapse temperature of the zeolite, the zeolite powder is now heated to the collapse temperature for a time of about 0.1 to about 2 hours to give an amorphous powder. This amorphous powder is now formed into a desired shape by means well known in the art. A typical method of forming a shaped article involves placing the zeolite powder into a metal die and then pressing the powder at pressures of about 500 to about 50,000 psi (3,440 to about 344,000 kPa). It has been found that the particle size of the lithium zeolite powder affects the characteristics of the ceramic article. A lithium zeolite powder with smaller particles can pack better, thereby forming a ceramic article with higher density. It has been found that a powder which contains smaller particles crystallizes more completely to the desired crystalline phase in a shorter period of time. Accordingly, it is preferred that the lithium zeolite powder have an average particle size smaller than about 10 microns and preferably smaller than about 5 microns. If the average particle size of the lithium zeolite powder is not less than 10 microns, the powder may be milled using conventional milling means such as ball milling, attrition milling and impact milling.

It is also desirable to add a binder to the powder as an aid in forming the shaped article. The binder may be selected from those well known in the art such as polyvinyl alcohol, and polyethylene glycol. If a binder is added, the amount which is to be added is up to about 15 weight percent.

Having formed the lithium zeolite into a desired shape, the shape is now sintered at a temperature of about 700° C. to about 1150° C. for a time of about 1 to about 12 hours. The resultant product obtained after sintering has been found to be substantially crystalline and has as its principal crystalline phase a beta-eucryptite phase, a beta-spodumene phase, or a mixture thereof. If the $SiO_2/Al_2O_3$ ratio is greater than about 3.0 then beta-spodumene will be the principal crystalline phase, whereas if the ratio is less than about 3.0 then beta-eucryptite will be the principal crystalline phase. It should be pointed out that if a mixture of zeolites with different $SiO_2/Al_2O_3$ ratios is used, the resultant product may be heterogeneous, i.e., have both beta-eucryptite and beta-spodumene phases or have the phase of the average $SiO_2/Al_2O_3$ ratio. By substantially crystalline is meant that at least 95% of the material is crystalline. By principal crystalline phase is meant that at least 90% of the crystalline phase of the article is beta-eucryptite, beta-spodumene or a mixture thereof. It has also been found that the ceramic article has a density of at least 90% of the theoretical density of beta-eucryptite or beta-spodumene.

In order to fully illustrate the instant invention, the following examples are set forth. It is to be understood that the examples are only by way of illustration and are not intended as an undue limitation on the broad scope of the invention as set forth in the appended claims.

EXAMPLE 1

This example shows the preparation of lithium exchanged zeolite B from the sodium form of zeolite B. In a container 27.1 g of LiCl were dissolved in 750 mL of distilled water and the pH was adjusted to 9.5 by adding a small amount of LiOH. To this solution there were added 25 grams of zeolite B (sodium form) (prepared according to the procedure in U.S. Pat. No. 3,008,803)

whose chemical and physical characteristics were: 25.3 weight percent $Al_2O_3$, 41.2 weight percent $SiO_2$, 15.5 weight percent $Na_2O$, 17.9 weight percent LOI, and a particle size of 40–50 microns. The chemical formula expressed as a ratio of the oxides on an anhydrous basis was determined to be: 1.0 $Na_2O$:1.0 $Al_2O_3$: 2.76 $SiO_2$. The resulting slurry was heated to reflux while stirring for 2 hours.

The zeolite powder was isolated by filtration, after which the powder was reexchanged four more times, each time with equal amounts of freshly prepared LiCl solution (adjusted to pH 9.5 as above), followed by another filtration. Finally, the powder was washed with a sufficient amount of distilled water to lower the level of chloride in the filtrate to levels that gave no detectable precipitate with drops of added silver nitrate solution. This sample was designated B1.

EXAMPLE 2

A small rectangular pellet measuring 0.76 cm in length, 0.64 cm in width and 0.64 cm in depth was prepared by placing an appropriate amount of sample B1 into a steel die and pressing at 5000 psi. The pellet was loaded into a horizontal recording dilatometer, with the long dimension used as the measured axis of shrinkage. The pellet was heated at 6° C. per minute to 1300° C. About 33% of the total shrinkage of the pellet (before it melted at 1300° C.) occurred gradually between 100° and 600° C. Between 600° C. and 700° C. the curve levelled off followed by a sharp shrinkage at between 700° and 800° C., indicating the remaining 67% of the shrinkage. The interpretation of this dilatometry curve is that the zeolite structure collapsed at about 600° C. and sintering of the powder to a crystalline ceramic phase occurred between 700° and 800° C. Therefore, the appropriate collapse temperature for this lithium exchanged zeolite powder is about 600° C.

EXAMPLE 3

An exchanged zeolite B is prepared as per Example 1 with the following modifications. The solution used for the exchange consists of 54 g of LiCl in 1.5 L of water and is adjusted to a pH of 9.5 with LiOH. To this solution there is added 100 g of zeolite B (sodium form) powder (prepared according to the procedure in Eur. Pat. Publ. 315,282) whose chemical composition expressed in anhydrous oxide ratios is $Na_2O$:1.0 $Al_2O_3$:5 $SiO_2$ and particle size is 2–10 microns. Five separate exchanges can be carried out as per Example 1 after which the analysis is expected to show less than 1 weight percent $Na_2O$ in the material. This sample is designated B2.

EXAMPLE 4

A similar dilatometric study of B2 is carried out as per B1 in Example 2. The dilatometric data is expected to indicate that the zeolite structure collapse occurs at a temperature at least 100° C. lower than the sintering temperature, thus allowing precalcination of the zeolite powder before forming and sintering to the final dense ceramic.

EXAMPLE 5

A portion of sample B1 is heated to 600° C. for about 1 hour to collapse the zeolite structure. This sample is placed into a 1.27 cm diameter steel die and is pressed at 10,000 psi. The pellet is removed from the die and heated at 6° C. per minute to 600° C., then at 1° C. per minute to 900° C. and held there for 4 hours. The pellet is expected to be crack-free, have the crystal structure of beta-eucryptite and have a density of at least 2.12 g/cc. See, V. Dondur and R. Dimitrijevic, *J. Solid State Chem.*, 63, (1986) 46–51 for the crystal structure characteristic of beta-eucryptite.

EXAMPLE 6

A portion of sample B2 is heated to 650° C. for about 1 hour to collapse the zeolite structure. This sample is placed into a 1.27 cm diameter steel die and is pressed at 10,000 psi. The pellet is removed from the die and heated at 6° C. per minute to 650° C., then at 1° C. per minute to 1000° C. and held there for 4 hours. The pellet is expected to be crack-free, have the crystal structure of beta-spodume and have a density of at least 2.13 g/cc. See, M. A. Subramonian et al., Mat. Res Bull., 21, (1986) 1525–1532 for the crystal structure characteristic of beta-spodumene.

We claim as our invention:

1. A process for preparing a substantially crystalline and crack free ceramic article comprising calcining a powder of a lithium-exchanged zeolite having a $SiO_2$/$Al_2O_3$ ratio from about 2 to about 8.5 selected from the group consisting of zeolite B, zeolite ZK-19, zeolite W, phillipsite, hormotome, gismondine and mixtures thereof and having a sodium content less than about 1 weight percent, at the collapse temperature of the zeolite for a time sufficient to collapse the zeolite framework and provide an amorphous powder, forming the amorphous powder into a shaped article and sintering the shaped article at a temperature of about 700° to about 1150° C., for a time of about 1 to about 12 hours, thereby forming a substantially crystalline ceramic article whose principal crystalline phase is a beta-eucryptite phase, a beta-spodumene phase, or a mixture thereof, has a density of at least 90% of its theoretical density and is substantially crack free.

2. The process of claim 1 where the sodium content of the lithium-exchanged zeolite is less than about 0.5 weight percent.

3. The process of claim 1 where the powder of the lithium-exchanged zeolite has an average particle size of less than about 10 microns.

4. The process of claim 1 where the lithium-exchanged zeolite is lithium-exchanged zeolite B.

* * * * *